United States Patent [19]

Trubiano

[11] Patent Number: 5,340,133
[45] Date of Patent: Aug. 23, 1994

[54] WIRE MESH EDGE PROTECTOR

[75] Inventor: Antoine Trubiano, Montreal, Canada

[73] Assignee: Cari-All, Inc., Montreal East, Canada

[21] Appl. No.: 971,475

[22] Filed: Nov. 4, 1992

[51] Int. Cl.5 .............................................. B62B 5/00
[52] U.S. Cl. ................................ 280/33.992; 24/460
[58] Field of Search ............... 280/33.992, 33.997, 280/33.998; 239/126, 127; 220/640, 641, 729, 730; 24/457, 460, 482, 530, 531, 532, 533, 462, 67.9

[56] References Cited

U.S. PATENT DOCUMENTS

| 184,355 | 11/1876 | Eastman | 24/67.9 X |
|---|---|---|---|
| 273,301 | 3/1883 | Page et al. | 24/67.9 |
| 305,665 | 9/1884 | Castles | 24/67.9 |
| 487,959 | 12/1892 | McDonald | 24/67.9 X |
| 1,876,464 | 9/1932 | Miller | 24/67.9 |
| 2,146,190 | 2/1939 | Luke | 24/533 X |
| 2,566,837 | 9/1951 | Huelsmeyer | 24/67.9 X |
| 2,598,238 | 5/1952 | Dorazio | 24/462 X |
| 3,539,204 | 11/1970 | Keller | 280/33.992 X |
| 3,702,018 | 11/1972 | Wood | 280/33.992 X |
| 3,964,134 | 6/1976 | Newtson | 280/33.992 |
| 4,011,636 | 3/1977 | Malacheski | 24/532 |
| 4,279,396 | 7/1981 | Bendock | 24/530 X |
| 4,793,030 | 12/1988 | Hirsch | 24/530 X |

FOREIGN PATENT DOCUMENTS

| 0297452 | 1/1989 | European Pat. Off. | 280/33.992 |
|---|---|---|---|
| 721786 | 3/1932 | France | 24/67.9 |
| 1056712 | 3/1954 | France | 24/67.9 |
| 157520 | 1/1921 | United Kingdom | 24/67.9 |

Primary Examiner—Brian L. Johnson
Attorney, Agent, or Firm—Longacre & White

[57] ABSTRACT

A wire mesh edge protector comprised of a flexible plastic strip of generally U-shape cross-section is disposed over the top edge of wire mesh walls of shopping carts and other forms of material handling containers and baskets. The protector strip has opposed flexible side walls and a bottom wall with a trough defined therebetween and an enlargement is provided in the trough adjacent the bottom wall. The trough receives the straight wire rod end portions of the transverse wire mesh wall and a straight edge rod in clamping fit therein.

6 Claims, 1 Drawing Sheet

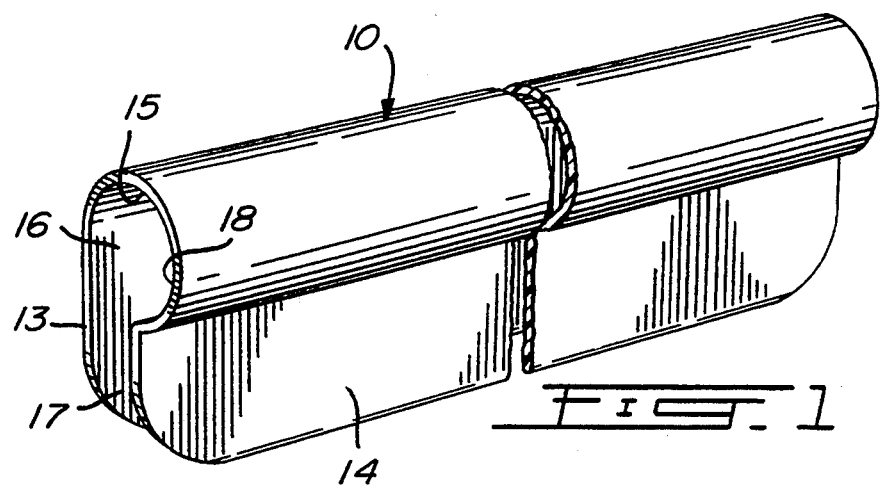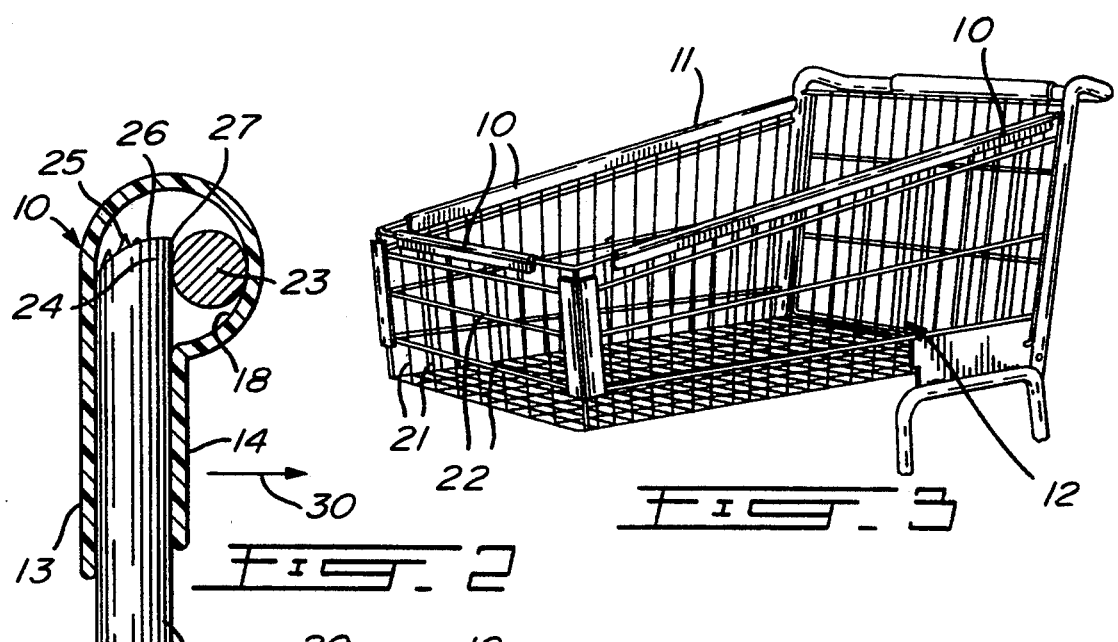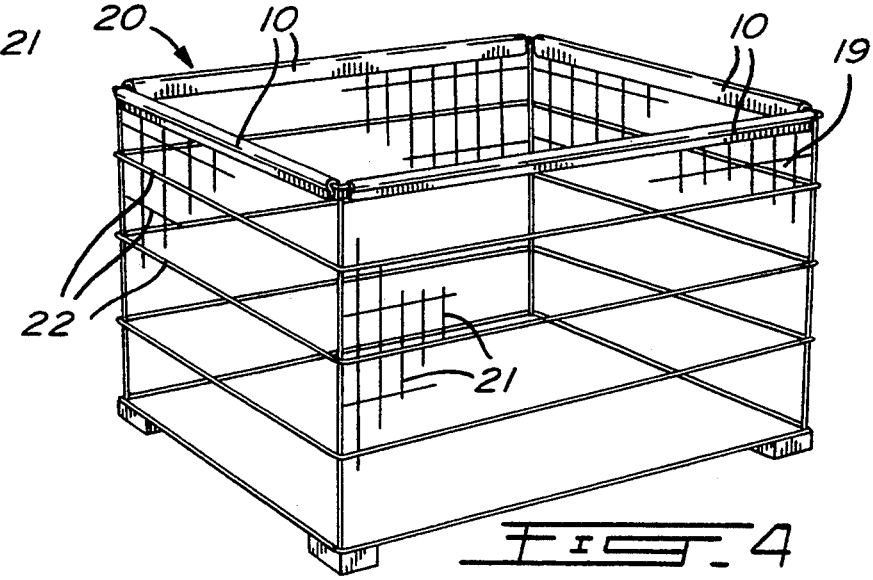

WIRE MESH EDGE PROTECTOR

TECHNICAL FIELD

The present invention relates to a wire mesh edge protector for protecting the exposed edges of shopping cart baskets, material handling containers, and other like containers fabricated from small diameter wire rods.

BACKGROUND ART

Various types of protecting accessories have been provided to offer protection to shopping carts or to prevent it from damaging articles of furniture or walls when obstructed by the shopping cart. Some of these items comprise plastic bumpers which are usually secured to the front corners of shopping carts which are susceptible to strike other objects. During the manufacture of shopping carts or other types of wire mesh containers, wire rods are cut to specific lengths and soldered together and sometimes bent to form walls and other sections for the baskets of shopping carts or material handling containers. When the rods are severed, they often form small sharp burrs at their severed ends. Usually, the top edge of such wire mesh walls consists of a plurality of vertically extending parallel wire rods with a transverse end rod soldered adjacent their top ends. The top ends of the vertical rods are thus exposed, and they have been found to cause injuries, particularly where they have burrs or a sharp edge. To alleviate this problem some shopping baskets or material handling baskets are usually polished at the top edge with a grinding tool. However, even after grinding the ends still have burrs and often the grinding sharpens the edges thereof making some of the rods even more hazardous. These burrs and sharp ends can scratch or cut the hands of persons handling the cart, often cause damage to the apparel of the persons using the carts or containers, and are also hazardous to children. These accidents are costly to merchants and insurance companies.

SUMMARY OF INVENTION

It is a feature of the present invention to provide a wire mesh edge protector which substantially overcomes the above-mentioned disadvantages of existing shopping cart baskets and material handling containers fabricated of wire mesh.

Another feature of the present invention is to provide a wire mesh edge protector which is an elongated strip of flexible material which is easy to install and relatively inexpensive.

Another feature of the present invention is to provide a wire mesh edge protector which may be supplied in strip form and cut to adapt to wire mesh shopping baskets or material handling containers of any size.

Another feature of the present invention is to provide a wire mesh edge protector strip of flexible plastic material which provides protection of the exposed wire mesh edges of shopping cart baskets and material handling containers, and which is aesthetically pleasing and may be utilized as a design feature for shopping carts and material handling containers. They also help identify carts of various merchants by having strips of different colors.

According to the above features, from a broad aspect the present invention provides a wire mesh edge protector adapted to be secured to a top edge of a shopping cart basket. The edge protector comprises an elongated protector strip of flexible material shaped for snap-fit retention over substantially the full length of a straight top edge of a wire mesh wall of the shopping cart basket. The edge of the basket is comprised of a straight edge wire rod disposed along an adjacent a common side of a plurality of terminal ends of transverse wires in the wire mesh wall. The protector strip has a generally U-shape cross-section defined by opposed flexible side walls, each extending in a straight plane and substantially parallel to one another. A bottom wall is formed integrally with and interconnects the side walls. The bottom wall forms a smooth uninterrupted protective wall for the top edge. A trough is defined between the flexible side walls and bottom wall. The trough has a narrow mouth opening which is narrower than the thickness of the transverse wires. An enlargement is provided in the trough adjacent the bottom wall. The trough receives the straight edge wire rod and terminal ends of the transverse wires and is in clamping fit thereover.

BRIEF DESCRIPTION OF DRAWINGS

A preferred embodiment of the present invention will now be described with reference to the accompanying drawings in which:

FIG. 1 is a fragmented perspective view illustrating the wire mesh edge protector strip of the present invention;

FIG. 2 is a section view showing the wire mesh edge protector positioned over a portion of an edge of a wire mesh wall;

FIG. 3 is a perspective view showing protector strips of the present invention secured to some of the top edges of a shopping cart basket; and FIG. 4 is a further perspective view showing the edge protector secured to the top edges of a material handling container.

DESCRIPTION OF PREFERRED EMBODIMENTS

Referring to the drawings, and more particularly to FIG. 1, there is shown generally at 10 the wire mesh edge protector of the present invention. The protector comprises an elongated protector strip of flexible plastic material and shaped for snap-fit retention over a straight edge, such as the edges 11 of a shopping cart basket 12, as shown in FIG. 3. The protector strip has a generally U-shape cross-section, as better seen in FIG. 2, and which is defined by opposed flexible side walls 13 and 14 and an integrally formed transverse wall or bottom wall 15. A trough 16 is integrally formed with the flexible side walls 13 and 14 and has a narrow mouth opening 17. An enlargement 18 is defined in the trough adjacent the bottom wall 15, and as herein shown, is constituted by a semi-circular enlargement formed in the trough 16 adjacent the bottom wall and merging into the bottom wall providing an asymmetrical portion.

Wire mesh shopping baskets 12 or side walls 19 of material handling containers, such as container 20 as shown in FIG. 4, are usually formed by a plurality of parallel extending wire rods, such as wire rods 21 in FIGS. 3 and 4, which are welded to transverse rods 22. A straight edge wire rod 23 is welded adjacent the terminal ends 24 of the parallel extending wire rods 21. As previously described, the parallel extending wire rods 21 are severed at their ends and often leave sharp burrs 25 which are hazardous. Some manufacturers try to eliminate these burrs by polishing or grinding the top face 20 of the wire rods 21. However, often other burrs are formed by grinding and another problem may arise in that corners at the top edge of the parallel extending rods 21 form sharp wedges, such as shown at 27, thus providing another hazard. In order to eliminate this hazard the wire mesh edge protector of the present invention is positioned and secured over the top edges 11 of the shopping cart basket 12, as shown in FIG. 3, or the material handling container 20, as shown in FIG. 4, or any other type of containers or baskets having this type of edge. FIG. 2 illustrates the edge protector in position concealing a substantial portion of this edge to eliminate this problem.

Because the strip is formed of plastic material, it has flexibility and is easy to install over wire mesh edges. The side walls 13 and 14 of the edge protector 10 extend substantially parallel to one another, and define a mouth opening 17 which is narrower than the thickness of the transverse wire rods 21. Accordingly, when the wire mesh edge protector is positioned over the transverse parallel rods 21 and the edge wire rod 23, it receives this edge portion of the side wall in clamping fit therein. Also, the fact that the enlargement is provided in the trough 16, it defines an inner pocket which, when installed over the edge of the wire mesh wall, receives the edge wire rod 23 therein and prevents the edge protector from being easily or accidentally removed. In order to remove the edge protector, it is necessary to apply a pulling force in the direction of arrow 30, as shown in FIG. 2, against the flexible side wall 14 and to pull the protector strip upwardly out of engagement. The edge protector is a plastic extrusion with a thickness having a stiffness sufficient to prevent the protector strip from being disconnected by children.

Another feature of this strip is that it may be extruded from plastic having color pigments therein to provide a design characteristic for the shopping cart or for material handling containers so as to match other color features of the shopping cart or baskets. To color strips also permits for easy identification of baskets from a group of baskets belonging to different merchants in a common shopping complex. This is a particularly desirable characteristic when shopping carts of various merchants are left straddled in large parking lots. The colored protector strip makes it easy to identify one's baskets from far away.

It is within the ambit of the present invention to cover any obvious modifications of the preferred embodiment described herein, provided such modifications fall within the scope of the appended claims.

I claim:

1. At least one wire mesh edge protector adapted to be secured to substantially an entire top edge of a shopping cart basket, each edge protector comprising an elongated protector strip of flexible material shaped for snap-fit retention over substantially the full length of each straight top edge of a wire mesh wall of the shopping cart basket, each top edge of the basket is comprised of a straight edge wire rod disposed along and adjacent a common side of a plurality of terminal ends of transverse wires in the wire mesh wall; said protector strip having a generally U-shape cross-section defined by opposed flexible side walls each extending in a straight plane and substantially parallel to one another, and a bottom wall formed integrally with and interconnecting the side walls; said bottom wall forming a smooth uninterrupted protective wall for the top edge, a generally circular trough having an asymmetrical portion integrally formed with said flexible side walls and bottom wall, said trough having a narrow mouth opening which is narrower than the thickness of said transverse wires, an enlargement defining said asymmetrical portion is formed in said trough adjacent said bottom wall, said trough receiving said straight edge wire rod and terminal ends of said transverse wires and being in clamping fit thereover.

2. A wire mesh edge protector as claimed in claim 1 wherein said protector strip is formed of plastics material.

3. A wire mesh edge protector as claimed in claim 2 wherein said enlargement is of substantially semi-circular cross-section and dimensioned to fit about an outer surface portion of said straight edge wire rod which has a circular cross-section.

4. A wire mesh edge protector as claimed in claim 2 wherein said protector strip is a rigid extruded plastic strip.

5. A wire mesh edge protector as claimed in claim 1 wherein said terminal ends of said transverse rods have rough ends with burrs projecting therefrom, said straight edge wire rod and transverse rods having a circular cross-section.

6. A wire mesh edge protector as claimed in claim 1 wherein said protector strip has a color to identify said shopping cart from carts of different merchants.

* * * * *